United States Patent

Papierniak et al.

[11] Patent Number: 5,825,751
[45] Date of Patent: Oct. 20, 1998

[54] METHOD AND APPARATUS FOR TRACING FRAMES TRANSMITTED THROUGH A NETWORK PATH

[75] Inventors: Karen A. Papierniak, St. Paul; Michael D. Ellestad, Brooklyn Park, both of Minn.

[73] Assignee: NCR Corporation, Dayton, Ohio

[21] Appl. No.: 711,613

[22] Filed: Sep. 10, 1996

[51] Int. Cl.[6] .................................................. H04L 12/56
[52] U.S. Cl. ......................... 370/248; 370/250; 370/397
[58] Field of Search ................................ 370/248, 249, 370/250, 395, 396, 397, 398, 399, 400, 409, 410, 428; 371/20.1, 20.4, 20.5, 67.1

[56] References Cited

U.S. PATENT DOCUMENTS

| 5,257,311 | 10/1993 | Naito et al. ................................. 380/48 |
|---|---|---|
| 5,299,209 | 3/1994 | Murayama et al. ..................... 371/67.1 |
| 5,329,527 | 7/1994 | Ujihashi et al. ......................... 370/397 |
| 5,331,628 | 7/1994 | Cheng et al. ............................. 370/248 |
| 5,337,307 | 8/1994 | Sato et al. ................................ 370/397 |
| 5,343,463 | 8/1994 | van Tetering et al. ................. 370/253 |
| 5,384,768 | 1/1995 | Fujii ........................................ 370/351 |
| 5,408,461 | 4/1995 | Uriu et al. ............................... 370/248 |
| 5,440,565 | 8/1995 | Miyamoto et al. ..................... 371/20.4 |
| 5,627,836 | 5/1997 | Conoscenti et al. .................... 370/397 |
| 5,634,097 | 5/1997 | Ashi et al. ............................... 370/248 |
| 5,675,578 | 10/1997 | Gruber et al. .......................... 370/248 |

*Primary Examiner*—Alpus H. Hsu
*Attorney, Agent, or Firm*—Ying Tuo

[57] ABSTRACT

A data section or a set of data sections (frames or cells) are transmitted through a plurality of network nodes. The network path taken by the data section or the set of data sections (frames or cells) is recorded into the data section or the set of data sections (frames or cells).

10 Claims, 12 Drawing Sheets

METHOD AND APPARATUS FOR TRACING FRAMES TRANSMITTED THROUGH A NETWORK PATH

BACKGROUND OF THE INVENTION

The present invention relates generally to a method and apparatus for tracing frames transmitted through a path in a communication network.

Typically, a network may connect many nodes, including user terminals, switches, hubs, bridges, routers, etc. In debugging a network, such as local area network called LAN, it is sometimes needed to trace the path of a frame (a packet or a cell) as it travels through the nodes in the network. In a network debugging process, a frame is called trace frame when it is sent from a source node to a destination node for the purpose of tracing the path taken between the source node and the destination node.

It is known that, in debugging a network that contains ATM (asynchronous transfer mode) network nodes and Ethernet network nodes, a cell is transmitted to travel through a source node and a destination node, a dedicated equipment called protocol analyzer is used to keep tracking the cell at each node passed. However, a protocol analyzer is relatively expensive. For example, the current price of a protocol analyzer manufactured by HP is about $100,000.

Furthermore, it is not convenient to use a protocol analyzer to trace a path if a network has many nodes physically far away from each other. By way of example, if a protocol analyzer is used to trace an exemplary path including four nodes in the sequence of: a first node, a second node, a third node, and a fourth node, the protocol analyzer can be first coupled to the second node to copy (or collect) all the cells that are transmitted on a specific VPI/VCI between the first node and the second node. It can then be coupled to the third node to copy (collect) the cells that are transmitted on a specific VPI/VCI between the second node and the third node. It can finally be coupled to the fourth node to copy (collect) the cells that are transmitted on a specific VPI/VCI between the third node and the fourth node. After all cells have been collected, they need to be correlated to determine the path. As illustrated in the process of tracing the exemplary path, to copy (or collect) the cells transmitted between the third and fourth nodes, the protocol analyzer has to be physically moved from one node to another node.

Therefore, there has been a need to provide a method and an apparatus that can trace frames (cells or packets) in a network economically and efficiently. The present invention meets this need.

SUMMARY OF THE INVENTION

In first aspect, the invention provides a method for recording path information in a network. The network includes a plurality of network nodes. The method comprises the steps of:

(a) generating a plurality of data sections, each of said data sections being able of storing path information;

(b) sending said data sections from one of said network nodes to another one of said network nodes; and (c) recording path information between said one network node and said another one network node in one of said data sections.

In second aspect, the invention provides a method recording path information in a network. The network includes a plurality of network nodes being named as $N_0, N_1, \ldots, N_i, \ldots, N_m$. The method comprises the steps of:

(a) generating a plurality of data sections being named as $F_1, F_2, \ldots, F_i, \ldots, F_m$, said $F_i$ (i=1, 2, ..., m) being able of storing path information between two adjacent network nodes $N_{i-1}$ and $N_i$ (i=1, 2, ..., m);

(b) sending said data sections from $N_0$ through said $N_i$ (i=1; 2m); and (c) recording path information between $N_{i-1}$ and $N_i$ (i=1, 2, ..., m) into $F_i$ (i=1, 2, ..., m).

In third aspect, the invention provides a method for recording path information in a network. The network includes a plurality of network nodes. The method comprises the steps of:

(a) generating a start and end data sections;

(b) sending said start and end data sections from one of said network nodes to another one of said network nodes;

(c) inserting a data section between said start and end data sections; and (c) recording path information between said one network node and said another one network node into said data section.

In fourth aspect, the invention provides a method for recording path information in a network. The network includes a plurality of network nodes being named as $N_0, N_1, \ldots, N_i, \ldots, N_m$. The method comprises the steps of:

(a) generating a start and end sections;

(b) sending said data sections from $N_0$ through said $N_i$ (i=1; 2, ...,m);

(c) between said start and end sections, inserting a plurality of data sections being named as $F_1, F_2, \ldots, F_i, \ldots, F_m$, said $F_i$ (i=1, 2, ..., m) being able of storing path information between two adjacent network nodes $N_{i-1}$ and $N_i$ (i=1, 2, ..., m); and (d) recording path information between $N_{i-1}$ and $N_i$ (i=1, 2, ..., m) into $F_i$ (i=1, 2, ..., m).

BRIEF DESCRIPTION OF THE DRAWING

The purpose and advantages of the present invention will be apparent to those skilled in the art from the following detailed description in conjunction with the appended drawing, in which.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to be accorded with the broadest scope consistent with the principles and features disclosed herein.

Figure 1A:
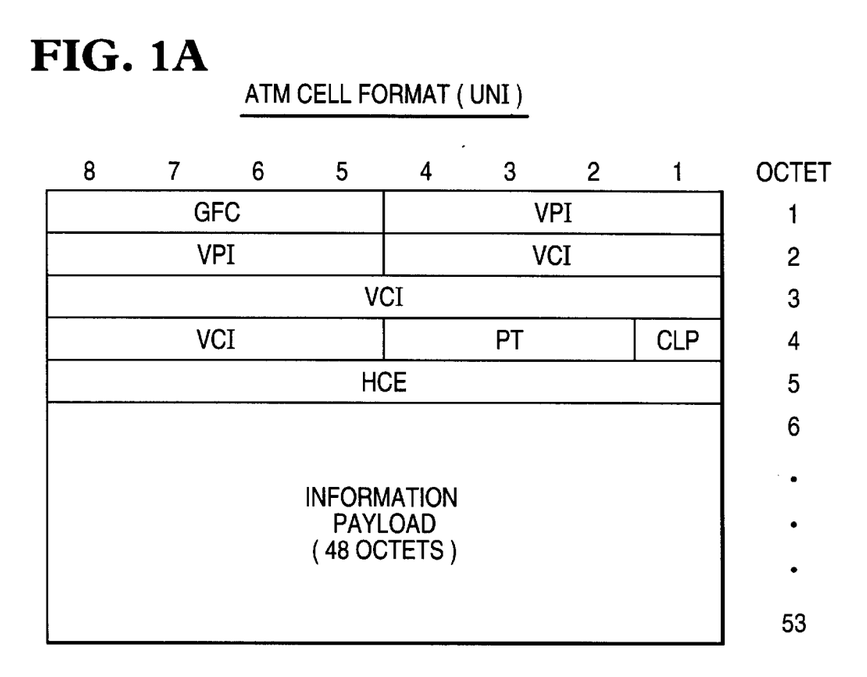
FIGS. 1A and 1B show two formats of ATM cells.
Figure 1B:
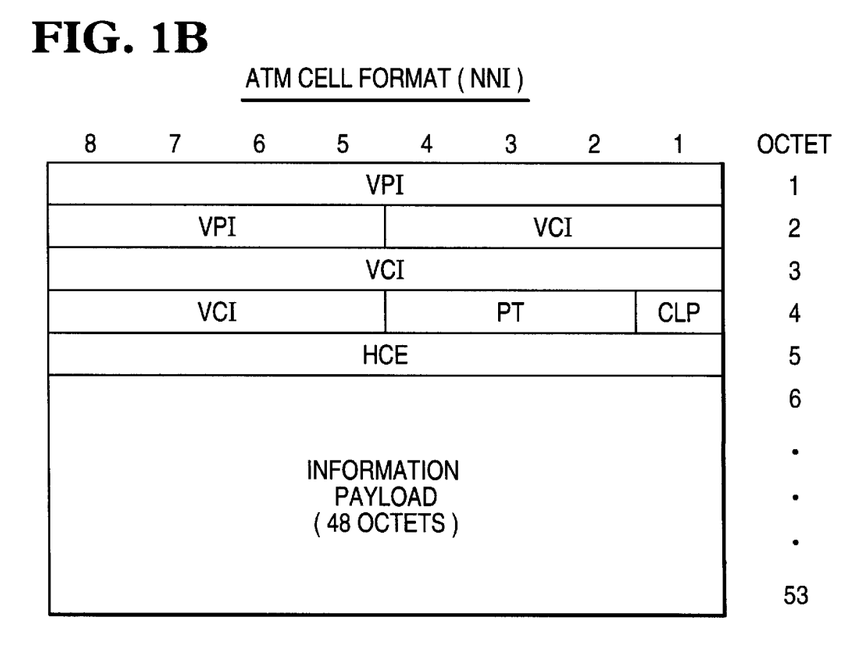

Referring to FIGS. 1A and 1B, there are shown two formats of ATM cells, namely UNI (user-network interface) format and NNI (network-network interface) format. Each ATM cell is 53 octets long consisting of a 5-octet header and a 48-octet payload.

In the header of UNI ATM cell shown in FIG. 1A, GFC (generic flow control) is a 4-bit field that can provide local function, such as flow control. VPI (virtual path indicator) is an 8-bit field that identifies the virtual path across the interface. VCI (virtual channel indicator) is a 16-bit field that identifies the virtual channel across an interface. PT (payload type) is a 3-bit field that identifies the type of information contained in payload. In PT field, value 110 is reserved for future traffic control and resource management, and 111 is reserved for future functions. CLP is an 1-bit field that the user or network uses to indicate cell's explicit loss priority. HEC is an 8-bit field that detects and/or corrects bit errors occurring in the header.

As shown in FIG. 1B, the header of NNI ATM cell has a format that is almost identical to UNI ATM cell, except for the first octet. Specifically, in UNI ATM cell, bits 5–8 of first octet are used as GFC; whereas in NNI ATM cell, bits 5–8 of first octet are used to extend the length of VPI from 8 bits to 12 bits.

Figure 2A:
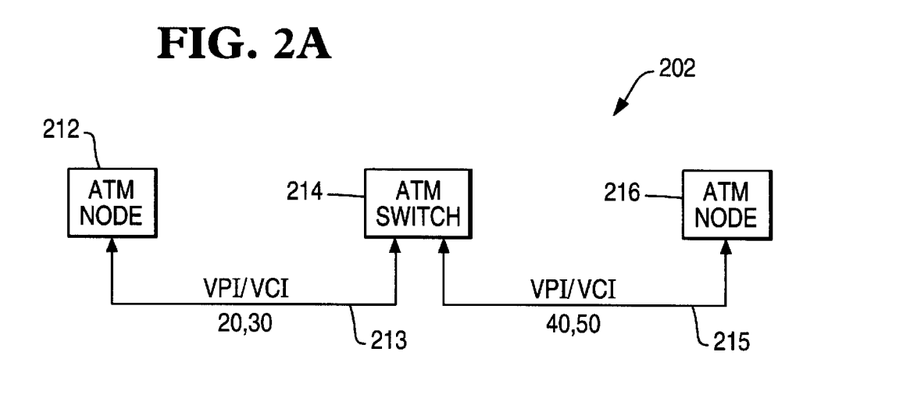
FIGS. 2A and 2B show two exemplary networks.

Referring to FIG. 2A, there is shown an exemplary ATM network 202, which includes three network nodes: two ATM nodes (212, 216) and an ATM switch 214.

In network 202, ATM node 212 is connected to ATM switch 214 via virtual path 213 identified by VPI/VCI with values of 20 and 30 respectively. ATM node 216 is connected to ATM switch 214 via virtual path 215 identified by VPI/VCI with values of 40 and 50 respectively.

Figure 2B:
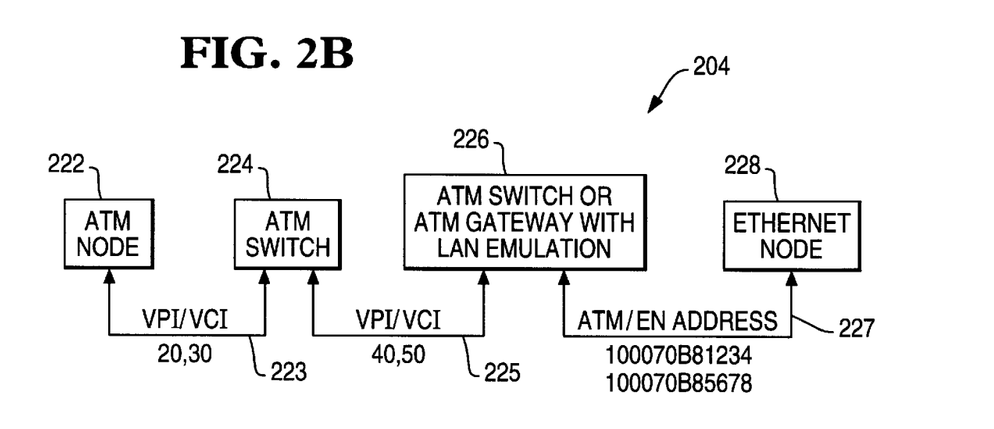

Referring to FIG. 2B, there is shown an exemplary ATM-Ethernet network 204, which includes four network nodes: an ATM node 222, an ATM switch 224, an ATM switch/gateway 226, and an Ethernet node 228.

In network 204, ATM node 222 is connected to ATM switch 224 via virtual path 223 identified by VPI/VCI with values of 20 and 30 respectively. ATM switch or ATM gateway 226 is connected to ATM switch 224 via virtual path 225 identified by VPI/VCI with values of 40 and 50 respectively. Ethernet node 228 is connected to ATM switch or ATM gateway 226 via virtual path 227 identified by ESI (end system identifier) portion of ATM address 100070B81234 and Ethernet MAC (medium access control) address 100070B85678. The ESI portion of ATM address is also known as MAC address.

In FIGS. 2A and 2B, ATM nodes 212, 216, 222 and 226 are capable of processing ATM data flow in appliance with ATM network protocols. Two ATM switches (214, 224) and ATM switch/gateway 226 are capable of switching ATM data flow in compliance with ATM network protocols. In addition, ATM switch/gateway 226 can process Ethernet data flow in compliance with Ethernet network protocol, so that ATM switch/gateway can be used in Ethernet LAN emulation environment. Ethernet node 228 is capable of processing Ethernet frames in compliance with Ethernet network protocols.

Figure 3:
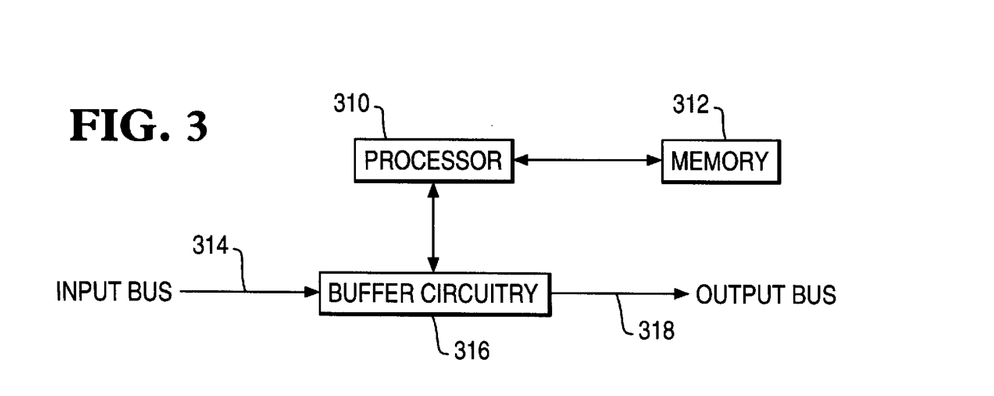
FIG. 3 shows some common function blocks within the network nodes of FIGS. 2A and 2B.

Referring to FIG. 3, there is shown some common function blocks contained in ATM nodes 212, 216 and 222; ATM switches 214 and 224; ATM switch/gateway 226; and Ethernet node 228. 7

As shown in FIG. 3, memory 312 is able to store programs (which includes instructions and data). Buffer circuitry 316 is able to receive frames/ATM cells via input bus 314, store the frames/ATM cells, and send the frames/ATM cells out via output bus 318. Processor 310 has access to memory 312 and is able to execute the programs to perform desired functions. Process 310 is also able to manipulate the frames/ATM cells received by buffer circuitry 316 and control the operation of buffer circuitry 316.

Before elaborating the present invention in further detail, it is beneficial to describe the gist of one embodiment of the present invention. To debug a network, a source node (called $N_s$) in the network generates a set of trace cells, including a start trace cell and a plurality of blank message trace cells, and sends the set of trace cells to an adjacent node (called $N_1$) in the network. After receiving the set of trace cells, $N_1$ finds the first blank message trace cell, fills it with the path information between $N_s$ and $N_1$, and sends the set of trace cells to its adjacent node (called $N_2$) in the network. After receiving the set of trace cells, $N_2$ finds the second blank message trace cell, fill it with the path information between $N_1$ and $N_2$, and sends the set of trace cells to its adjacent node (called $N_3$) in the network. This process is repeated until the set of trace cells reaches a destination node (called $N_n$) where the path information between $N_{n-1}$ and $N_n$ is filled into $n^{th}$ blank message trace cell. At the destination node, the path information can be collected from the set of trace cells.

Referring to FIGS. 4A–4D, there are shown four sets of ATM trace cells, in accordance with one embodiment of the present invention.

Referring to FIGS. 5A–5D, there are shown four sets of ATM trace cells, in accordance with another embodiment of the present invention.

Referring to FIGS. 6A–6D, there shown a trace cell for recording path information while it is traveling through network nodes, in accordance with still another embodiment of the present invention.

As discussed above, since in PT field, value 110 and 111 are reserved for future functions, either value in PT field can be used to indicate a trace cell. A specific value in first octet of payload can be used to indicate trace cell type. For example, in first octet, 00000001 can be used to indicate start trace cell; 00000000 a blank message trace cell; 00000010 a filled trace cell; and 00000011 an end trace cell (operational).

Figure 7A:
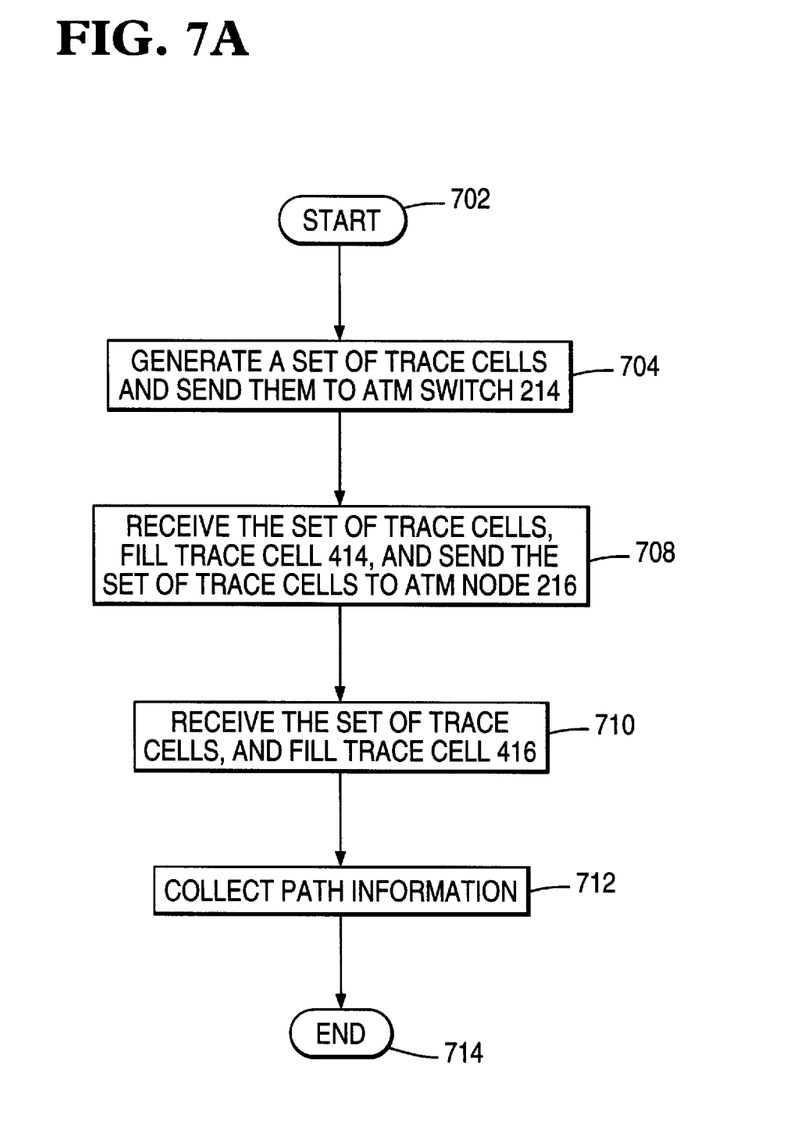
FIG. 7A shows a flowchart illustrating a process of tracing a path for network 202 as shown in FIG. 2A, in accordance with the present invention.

Referring to FIG. 7A, there is shown a flowchart illustrating a process of tracing a path for network 202 as shown in FIG. 2A, in accordance with the present invention.

Figure 4A:
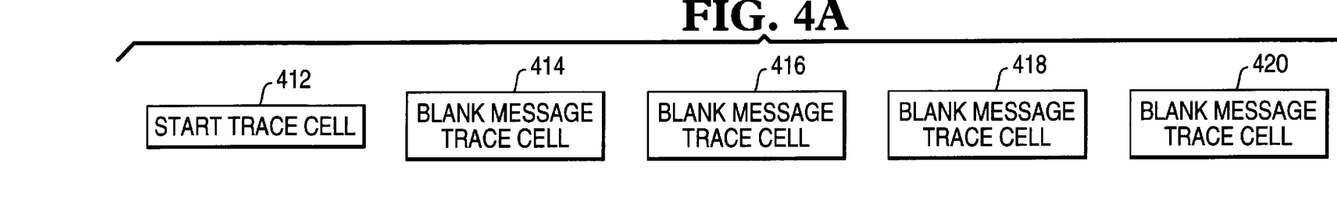
FIGS. 4A–4D show five sets of ATM cells for recording path information, in accordance with one embodiment of the present invention.

In step 704, as a source node, ATM node 212 generates a set of trace cells (one start trace cell and four blank message trace cells numerated as 412, 414, 416, 418, 420, respectively, as shown in FIG. 4A), and sends this set of trace cells to ATM switch 214. The values of the PT fields in all five trace cells are either 110 or 111, indicating these cells are trace cells. The start trace cell indicates the start position of the trace cells, and each of the message trace cells is able to record path information. The value of the first octet in the payload of the start trace cell is 00000001, indicating a start trace cell; and the value of the first octet in the payloads of all four blank message trace cells is 00000000, indicating a blank message trace cell.

Figure 4B:
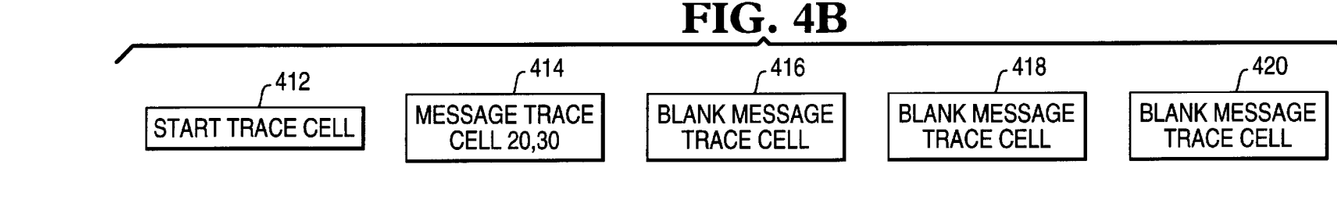

In step 708, ATM switch 214 receives the set of trace cells as shown in FIG. 4A; skips start trace cell by checking the value of the first octet; finds first blank message trace cell (which is trace cell 414) by checking the value of the first octet, fills VPI/VCI value (20,30 in this step) into trace cell 414 as shown in FIG. 4B; and changes value of the first octet in trace cell 414 from 00000000 to 00000010, indicating that trace cell 414 is a filled message trace cell. Then, ATM switch 214 sends the set of trace cells as shown in FIG. 4B to ATM node 216.

In step 710, ATM node 216 receives the set of trace cells as shown in FIG. 4B; skips start trace cell by checking the value of the first octet in the payload; skips message trace cell 414 because the value of the first octet in the payload is 00000010, indicating that it is a filled message trace cell; finds first blank message trace cell (which is trace cell 416) by checking the value of the first octet in the payload, fills VPI/VCI value (40,50 in this step) into trace cell 416; and changes value of the first octet of the payload in trace cell 416 from 00000000 to 00000010, indicating that trace cell 416 is a filed message trace cell.

Figure 4C:
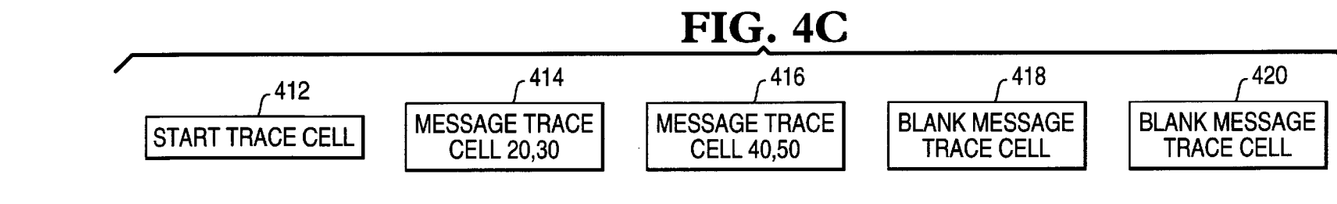

In step 712, since ATM node 216 is a destination node, the path information is collected from the set of trace cells as shown in FIG. 4C.

Figure 7B:
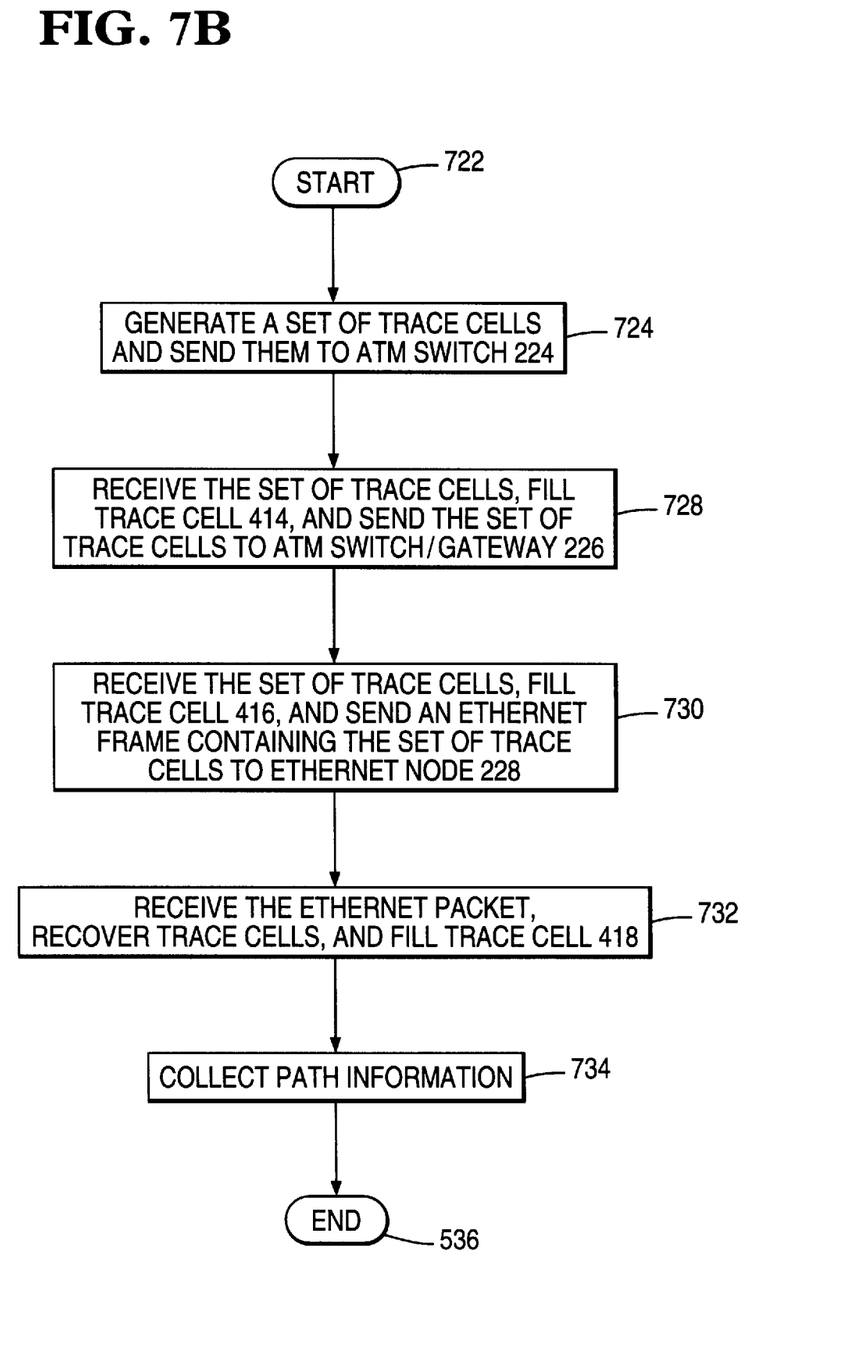
FIG. 7B shows a flowchart illustrating a process of tracing a path for network 204 as shown in FIG. 2B, in accordance with the present invention.

Referring to FIG. 7B, there is shown a flowchart illustrating a process of tracing a path for network 204 as shown in FIG. 2B, in accordance with the present invention.

In step 724, as a source node, ATM node 222 generates a set of trace cells (one start trace cell and four blank message trace cells numerated as 412, 414, 416, 418, 420, respectively, as shown in FIG. 4A), and sends this set of trace cells to ATM switch 224. The values of in the fields of the five trace cells are set the same as described in step 704 above.

In step 728, ATM switch 224 receives the set of trace cells as shown in FIG. 4A; skips start trace cell by checking the value of the first octet in the payload; finds first blank message trace cell (which is trace cell 414) by checking the value of the first octet in the payload, fills VPI/VCI value (20,30 in this step) into trace cell 414; and changes value of the first octet in the payload of trace cell 414 from 00000000 to 00000010, indicating that trace cell 414 is a filled message trace cell. Then, ATM switch 224 sends the set of trace cells as shown in FIG. 4B to ATM switch/gateway 226.

In step 730, ATM switch/gateway 226 receives the set of trace cells as shown in FIG. 4B; skips start trace cell by checking the value of the first octet in the payload; skips trace cell 414 because the value of the first octet in the payload is 00000010, indicating that it is a filled message trace cell; finds first blank message trace cell (which is trace cell 416) by checking the value of the first octet in the payload, fills VPI/VCI value (40,50 in this step) into trace cell 416; and changes value of the first octet in the payload of trace cell 416 from 00000000 to 00000010, indicating that trace cell 416 is a filled message trace cell. Before sending the set of trace cells to Ethernet node 228, ATM switch/gateway 226 generates an Ethernet frame and embeds the set of trace cells as shown in FIG. 4C into the Ethernet frame.

Figure 4D:
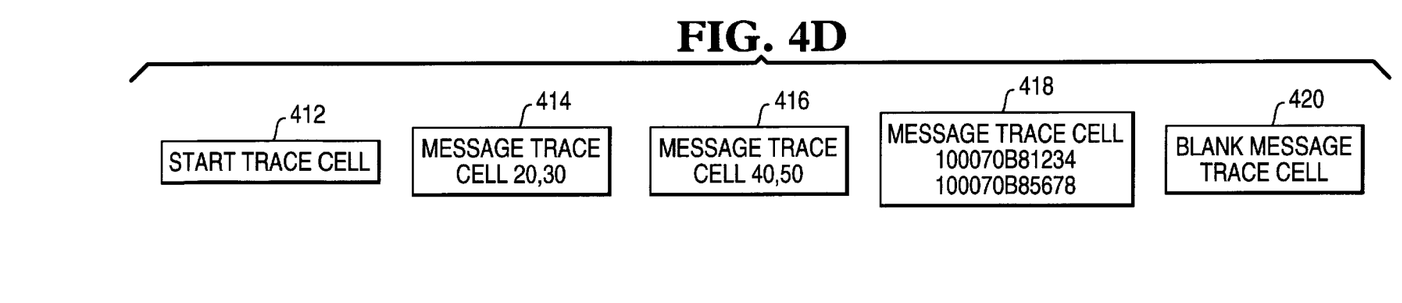

In step 732, after receiving the Ethernet frame, Ethernet node 228 recovers the trace cells into the format as shown in FIG. 4C, finds the first blank message trace cell (which is trace cell 418), and fills ATM/Ethernet address value (100070B81234, 100070B85678 in this step) into trace cell 418 as shown in FIG. 4D; and changes value of the first octet in the payload of trace cell 418 from 00000000 to 00000010, indicating that trace cell 418 is a filled message trace cell.

In step 734, since Ethernet node 228 is a destination node, the path information is collected from the set of trace cells as shown in FIG. 4D.

Figure 8A:
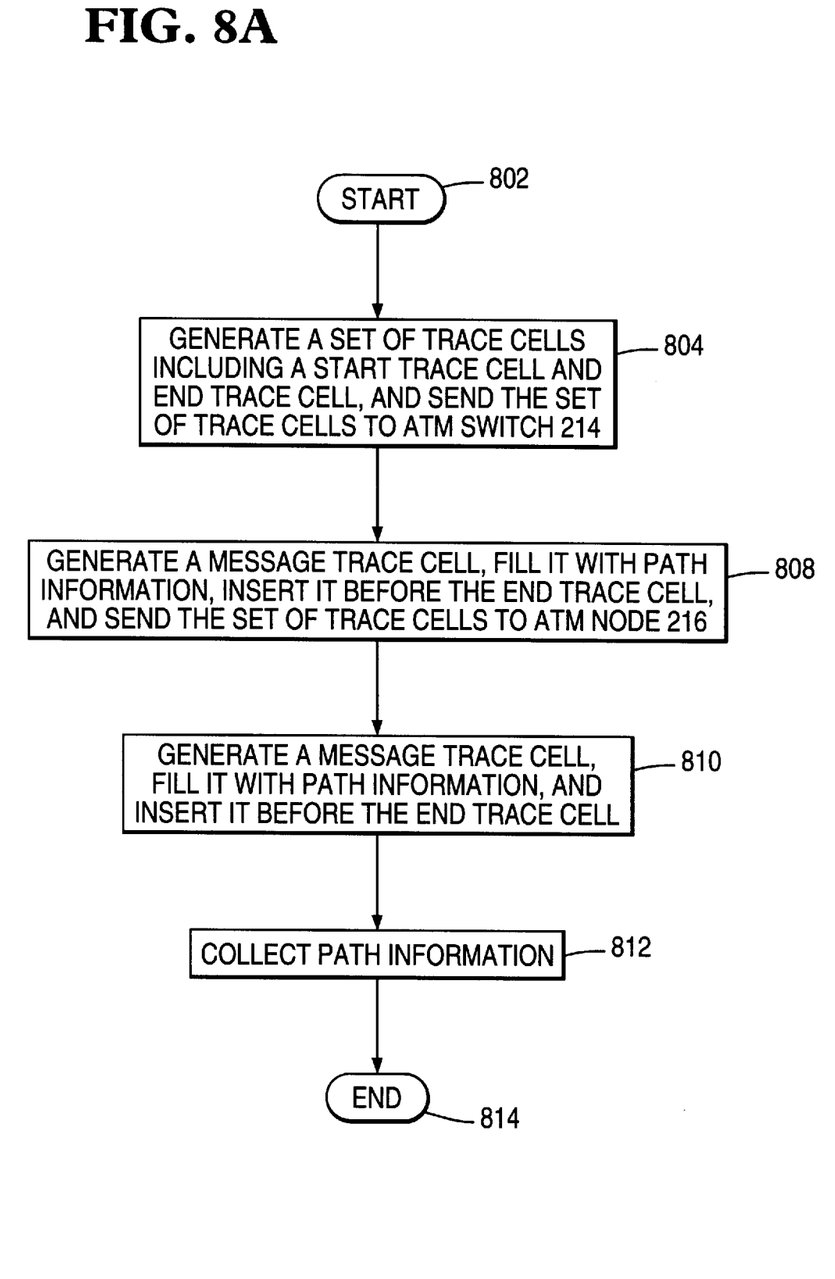
FIG. 8A shows a flowchart illustrating another process of tracing a path for network 202 as shown in FIG. 2A, in accordance with the present invention.

Referring to FIG. 8A, there is shown a flowchart illustrating another process of tracing a path for network 202 as shown in FIG. 2A, in accordance with the present invention.

Figure 5A:
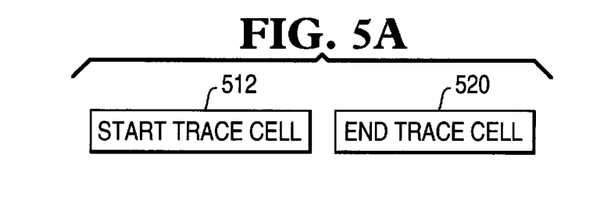
FIGS. 5A–5D show five sets of ATM cells for recording path information, in accordance with another embodiment of the present invention.

In step 804, as a source node, ATM node 212 generates a set of trace cells (one start trace cell and one end trace cell numerated as 512, 520, respectively, as shown in FIG. 5A), and sends this set of trace cells to ATM switch 214. The values of the PT fields in these two are 110 or 111, indicating these cells are trace cells. The start trace cell and end trace cell indicate the start and ending positions of the set of trace cells. The value of the first octet of the payload in the start trace cell is 00000001, indicating a start trace cell; and the value of the first octet of the payload in the end cell is 00000011, indicating an end trace cell.

In step 808, ATM switch 214 receives the set of trace cells as shown in FIG. 5A; skips the start trace cell and finds the end trace cell, by checking the values of the first octet in the payloads of these two cells; generates a message trace cell (which is trace cell 514 shown in FIG. 5B), and fills VPI/VCI value (20, 30 in this step) into trace cell 514; fills the value of PT field with 110 or 111; fills the value of the first octet of the payload in trace cell 514 with 00000010, indicating that trace cell 514 is a filled message cell; and inserts trace cell 514 before the end trace cell. Then, ATM switch 214 sends the set of trace cells as shown in FIG. 5B to ATM node 216.

Figure 5B:
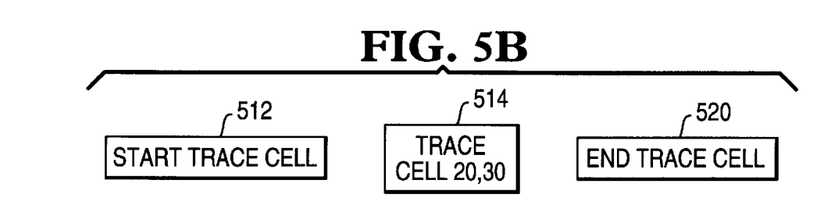

In step 810, ATM node 216 receives the set of trace cells as shown in FIG. 5B; finds the end trace cell; generates a message trace cell (which is trace cell 516 shown in FIG. 5C) by, fills VPI/VCI value (40, 50 in this step) into trace cell 516; fills the value of PT filed with 110 or 111, fills value of the first octet in the payload of trace cell 516 with 00000010, indicating that trace cell 516 is a filled message trace cell; and insert trace cell 516 before the end trace cell.

Figure 5C:
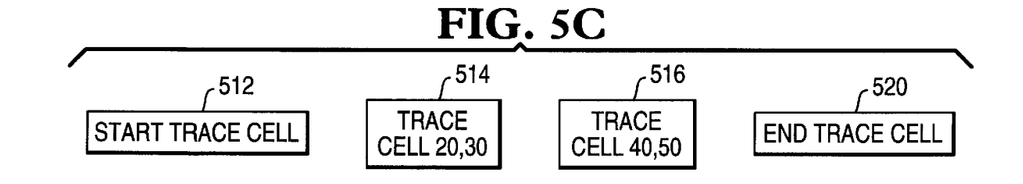

In step 812, since ATM node 216 is a destination node, the path information is collected from the set of trace cells as shown in FIG. 5C.

Figure 8B:
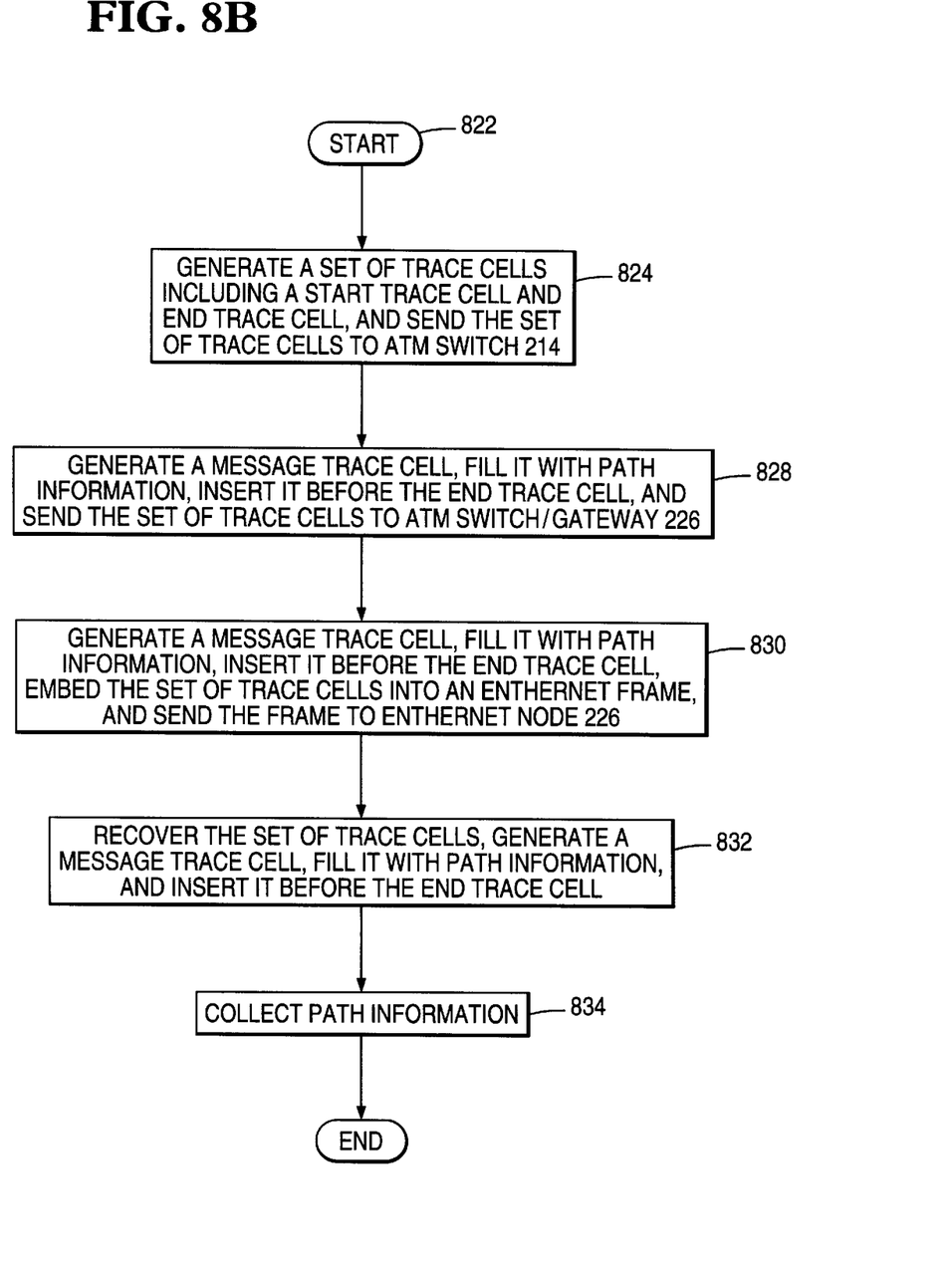
FIG. 8B shows a flowchart illustrating another process of tracing a path for network 204 as shown in FIG. 2B, in accordance with the present invention.

Referring to FIG. 8B, there is shown a flowchart illustrating another process of tracing a path for network 204 as shown in FIG. 2B, in accordance with the present invention.

In step 824, as a source node, ATM node 222 generates a set of trace cells (one start trace cell and one end trace cell numerated as 512, 520, respectively, as shown in FIG. 5A), and sends this set of trace cells to ATM switch 224. The values of in the fields of trace cells are set the same as in step 804 above.

In step 828, ATM switch 224 receives the set of trace cells as shown in FIG. 5A; finds end trace cell; generates a message trace cell (which is trace cell 514 shown in FIG.

5B), and fills VPI/VCI value (20, 30 in this step) into the payload of trace cell 514; fills value of the first octet in the payload of trace cell 514 with 00000010, indicating that trace cell 514 is a filled message trace cell; and inserts trace cell 514 before the end trace cell. Then, ATM switch 224 send the set of trace cells as shown in FIG. 5B to ATM switch/gateway 226.

In step 830, ATM switch/gateway 226 receives the set of trace cells as shown in FIG. 5B; finds the end trace cell, generates a message trace cell (which is trace cell 516 shown in FIG. 5C), fills VPI/VCI value (40, 50 in this step) into the payload of trace cell 516; fills the value of the first octet in the payload of trace cell 516 with 00000010, indicating that trace cell 516 is a message filled trace cell; and inserts trace cell 516 before the end trace cell. Before sending the set of trace cells to Ethernet node 228, ATM switch/gateway 226 generates an Ethernet frame and embeds the set of trace cells as shown in FIG. 5C into the Ethernet frame.

In step 832, after receiving the Ethernet packet, Ethernet node 228 recovers the trace cells in to the format as shown in FIG. 5C. Then, Ethernet node 228 finds the end trace cell, generates a message trace cell (which is trace cell 518 shown in FIG. 5D), and fills ATM/Ethernet address value (100070B81234, 100070B85678 in this step) into the payload of trace cell 518; fills value of the first octet in the payload of trace cell 518 with 00000010, indicating that trace cell 518 is a filled message trace cell; and insert trace cell 518 before the end cell.

Figure 5D:
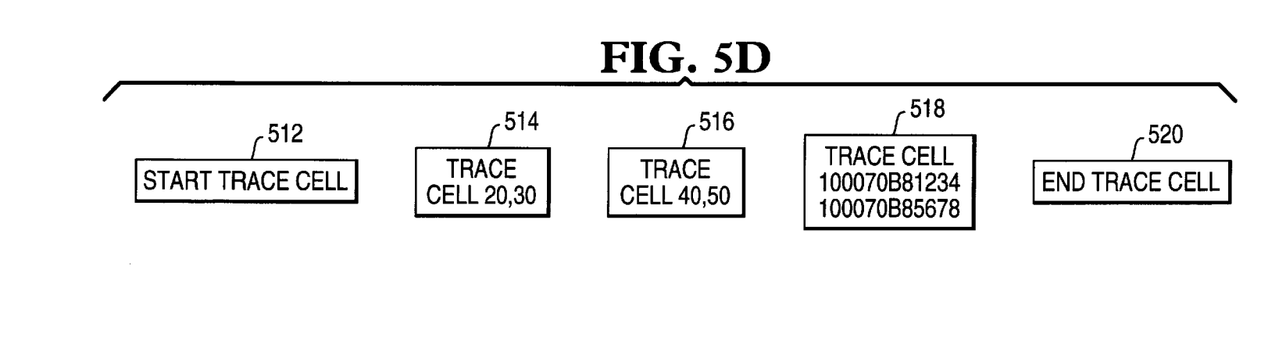

In step 834, since Ethernet node 228 is a destination node, the path information is collected from the set of trace cells as shown in FIG. 5D.

Figure 9A:
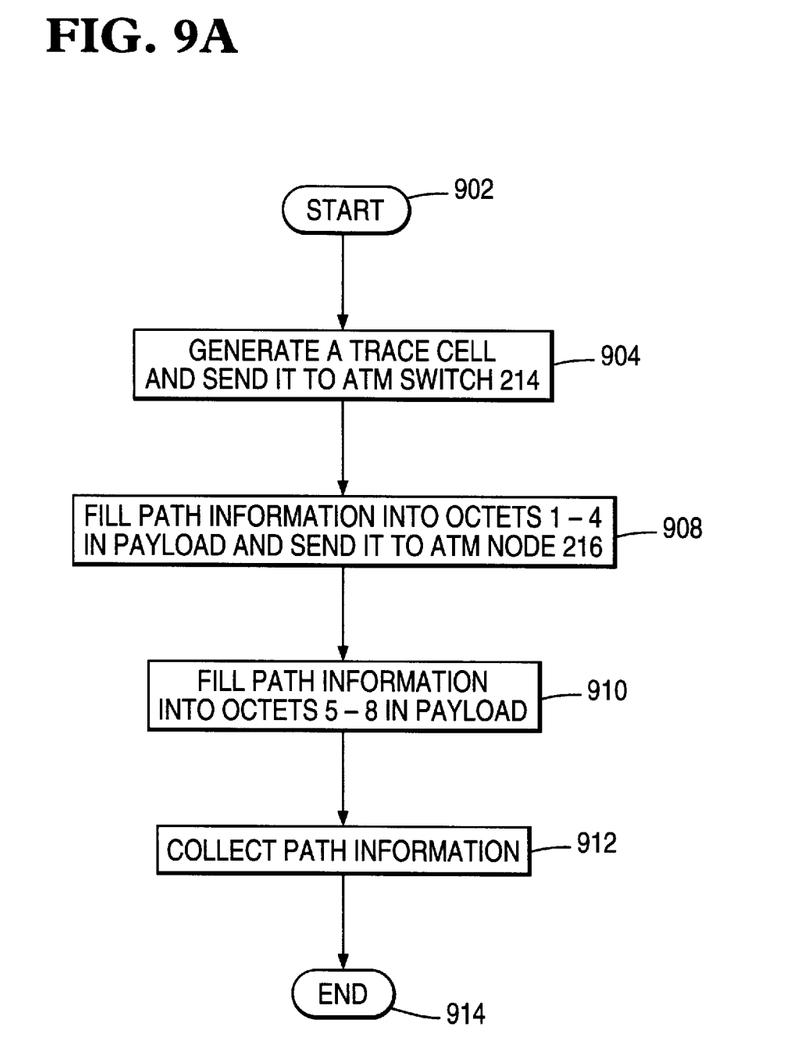
FIG. 9A shows a flowchart illustrating still another process of tracing a path for network 202 as shown in FIG. 2A, in accordance with the present invention.

Referring to FIG. 9A, there is shown a flowchart illustrating still another process of tracing path for network 202 as shown in FIG. 2A, in accordance with the present invention.

Figure 6A:
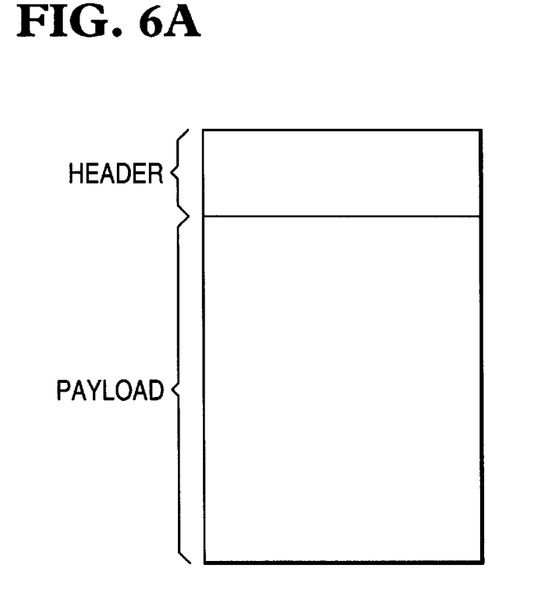
FIGS. 6A–6D show an ATM cell for recording path information, in accordance with still another embodiment of the present invention.

In step 904, as a source node, ATM node 212 generates a trace cell shown in FIG. 6A, and sends this trace cell to ATM switch 214. The value of the PT field in the trace cell is either 110 or 111, indicating this cell is a trace cell. The value in the payload is all zeros.

In step 908, ATM switch 214 receives the trace cell as shown in FIG. 6A and fills VPI/VCI value (20,30 in this step) into octets 1–4 in the payload. Then, ATM switch 214 sends the trace cell as shown in FIG. 6B to ATM node 216.

Figure 6B:
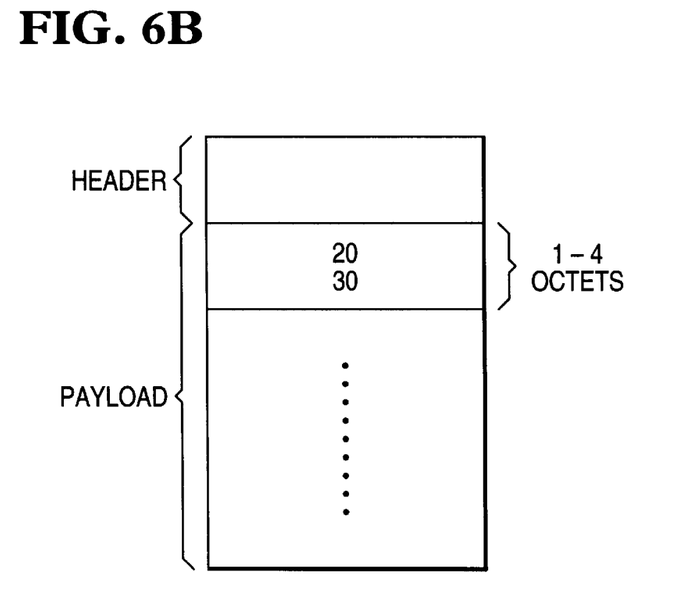
Figure 6C:
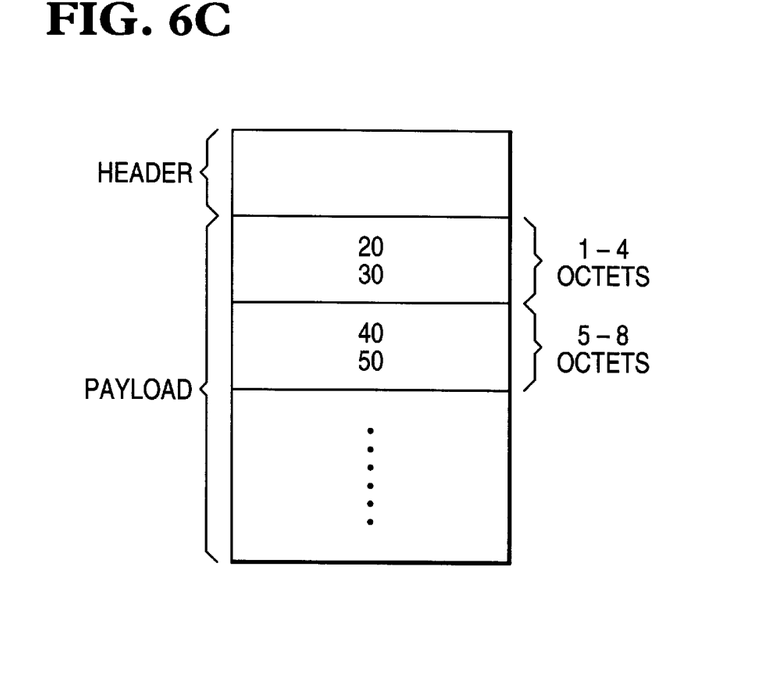

In step 910, ATM node 216 receives the trace cell as shown in FIG. 6B, fills VPI/VCI value (40,50 in this step) into octets 5–8 in payload as shown in FIG. 6C.

In step 912, since ATM node 216 is a destination node, the path information is collected from the payload of the trace cell as shown in FIG. 6C.

Figure 9B:
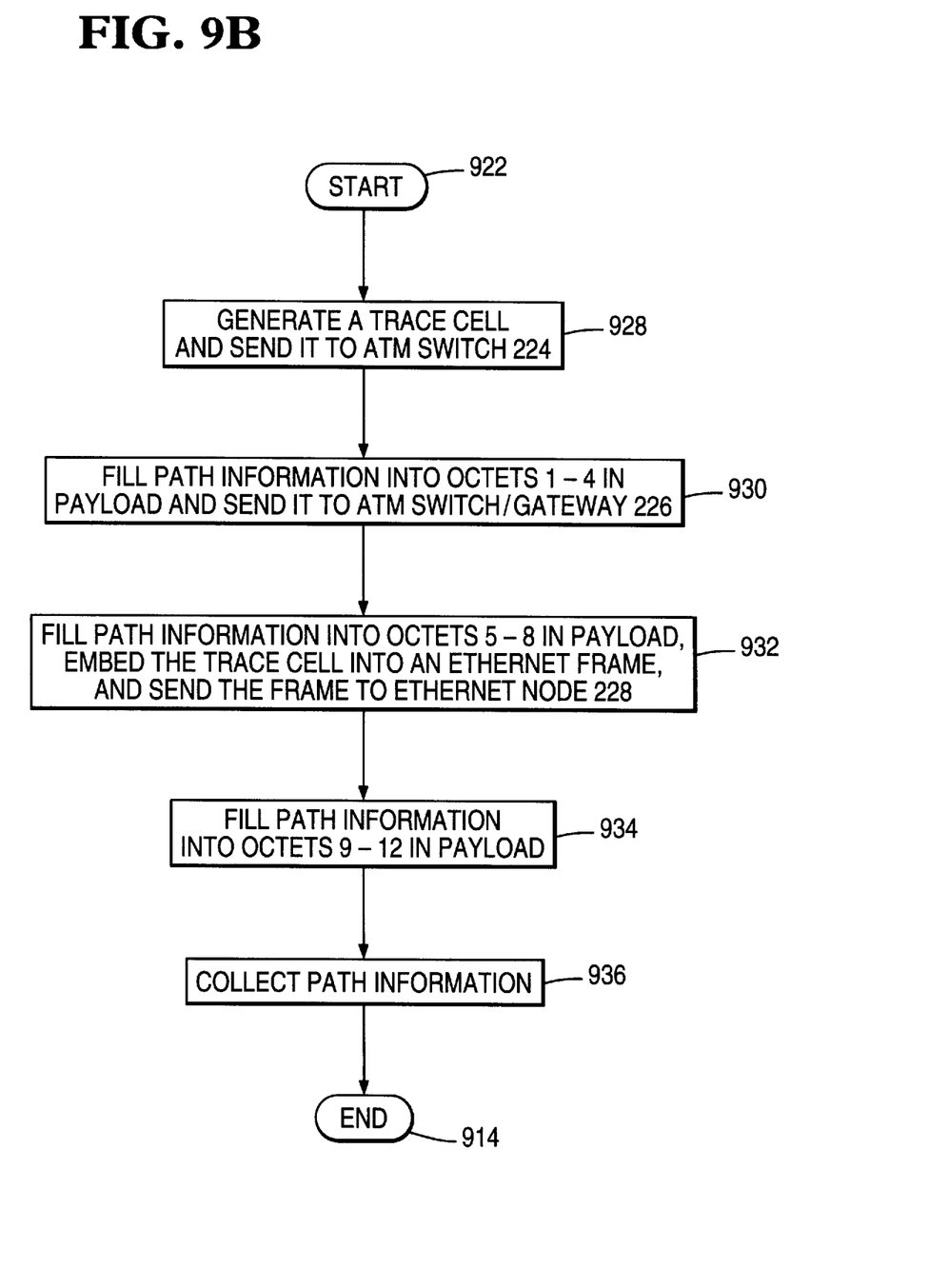
FIG. 9B shows a flowchart illustrating still another process of tracing a path for network 204 as shown in FIG. 2B, in accordance with the present invention.

Referring to FIG. 9B, there is shown a flowchart illustrating still another process of tracing a path for network 204 as shown in FIG. 2B, in accordance with the present invention.

In step 928, as a source node, ATM node 222 generates a trace cell as shown in FIG. 6A and sends this trace cells to ATM switch 224. The values of in the fields of the trace cell are the same as described in step 904 above.

In step 930, ATM switch 224 receives the trace cell as shown in FIG. 6A; fills VPI/VCI value (20,30 in this step) into octets 1–4 in payload, and sends the trace cell as shown in FIG. 6B to ATM switch/gateway 226.

In step 932, ATM switch/gateway 226 receives the trace cell as shown in FIG. 6B; and fills VPI/VCI value (40,50 in this step) into octets 5–8 in the payload. Before sending the trace cell to Ethernet node 228, ATM switch/gateway 226 generates an Ethernet frame and embeds the trace cell as shown in FIG. 6C into the Ethernet frame.

In step 934, after receiving the Ethernet frame, Ethernet node 228 recovers the trace cell in to the format as shown in FIG. 6C. Then, Ethernet node 228 fills ATM/Ethernet address value (100070B81234, 100070B85678 in this step) into octets 9–12 in the payload.

Figure 6D:
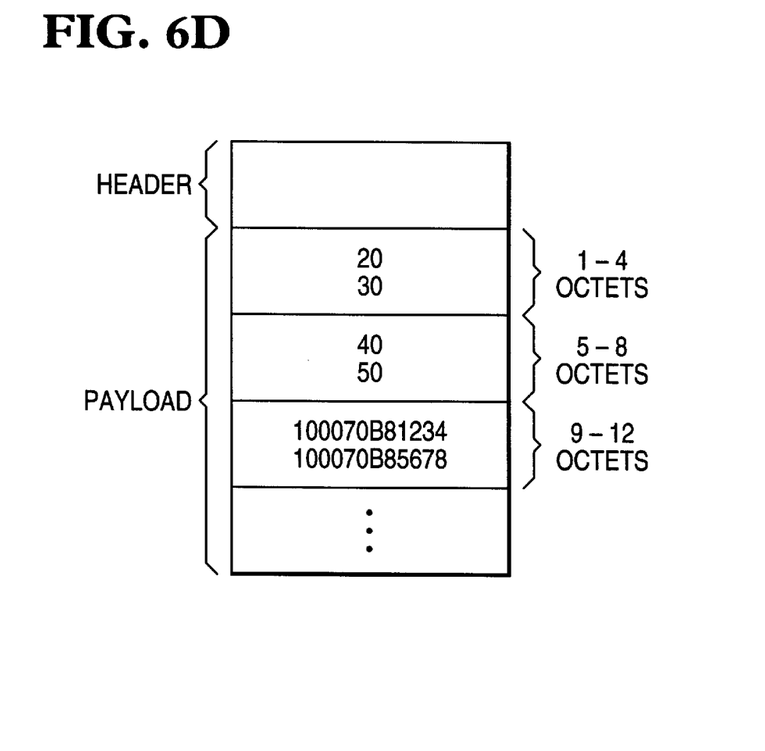

In step 936, since Ethernet node 228 is a destination node, the path information is collected from the trace cell as shown in FIG. 6D.

In the present invention, the software to perform the steps shown in FIGS. 7A, 7B, 8A, 8B, 9A and 9B is stored in memory 312 and executed by processor 310.

While the invention has been illustrated and described in detail in the drawing and foregoing description, it should be understood that the invention may be implemented through alternative embodiments within the spirit of the present invention. By way of one example, the embodiments in FIGS. 7A, 7B, 8A, 8B, 9A and 9B specifically use ATM cells to record path information. However, the principle in the present invention also applies to other formats of frames. Thus, the scope of the invention is not intended to be limited to the illustration and description in this specification, but is to be defined by the appended claims.

What is claimed is:

1. A method for recording path information in an ATM network, said network including a plurality of network nodes having a start network node and an end network node, said method comprising the steps of:

(a) at said start network node. generating a start and an end trace cells;

(b) sending said start and end trace cells from said start network node to said end network node;

(c) for a pair of adjacent network nodes, inserting a message trace cell between said start and end trace cells; and (d) recording virtual path information between said pair of adjacent network nodes into said inserted message trace cell, wherein a message trace cell is used to record virtual path information for each pair of adjacent network nodes.

2. The method of claim 1, further comprising the step of:

at said end network node, collecting said inserted message cell so that said virtual path information can be obtained.

3. A method for recording path information in an ATM network, said network including a plurality of network nodes being named as $N_0, N_1, \ldots, N_i, \ldots, N_m$, said $N_0$ being a start network node and $N_m$, an end network node, said method comprising the steps of:

(a) at network node $N_0$, generating a start and an end trace cells;

(b) sending said start and end trace cells from $N_0$ through said $N_i$ (i=1; 2, . . ., m);

(c) between said start and end trace cells, inserting a plurality of message trace cells being named as $F_1, F_2, \ldots, F_i, \ldots, F_m$, said $F_i$ (i=1, 2, . . ., m) being capable of storing virtual path information between two adjacent network nodes $N_{i-1}$ and $N_i$ (i=1, 2, . . ., m); and (d) recording virtual path information between $N_{i-1}$ and $N_i$ (i=1, 2, . . ., m) into said inserted $F_i$ (i=1, 2, . . ., m) message trace cell, wherein a message trace cell is used to record virtual path information for each pair of adjacent network nodes.

4. The method of claim 3, further comprising the step of:

at said network node $N_m$, collecting said inserted message trace cells so that said virtual path information can be collected.

5. A method for recording path information in an ATM network, said network including a plurality of network nodes having a start network node and an end network node, said method comprising the steps of:

(a) at said start network node, generating a start trace cell and a sequence of empty message trace cells;

(b) sending said start trace cell and said sequence of empty message trace cells from said start network node to said end network node; and (c) for a pair of adjacent network nodes, recording virtual path information between said pair of adjacent network nodes into an empty message trace cell in said sequence of empty message trace cells, wherein an empty message trace cell is used to record path information for each pair of adjacent network nodes.

6. The method of claim 5, further comprising the step of:

at said end network node, collecting said message trace cell so that said virtual path information can be obtained.

7. The method of claim 5, wherein said virtual path information is recorded into a first empty message trace cell in said sequence of empty message cells.

8. A method for recording path information in an ATM network, said network including a plurality of network nodes being named as $N_0, N_1, \ldots, N_i, \ldots, N_m$, said $N_0$ being a start network node and $N_m$ an end network node, said method comprising the steps of:

(a) at $N_0$ network node, generating a start trace cell and a sequence of empty message trace cells;

(b) sending said start trace cell and sequence of empty message trace cells from $N_0$ through said $N_i$ (i=1; 2, . . ., m); and (c) recording virtual path information between $N_{i-1}$ and $N_i$ (i=1, 2, . . ., m) into an empty message trace cell in said sequence of empty message trace cells, wherein an empty message trace cell is used to record virtual path information for each pair of adjacent network nodes.

9. The method of claim 8, further comprising the step of:

at $N_m$ network node, collecting said recorded message trace cells so that said path information can be collected.

10. The method of claim 9, wherein said path information is recorded into a first empty message cell in said sequence of empty message trace cells.

* * * * *